United States Patent
Komiya et al.

(10) Patent No.: US 12,389,177 B2
(45) Date of Patent: Aug. 12, 2025

(54) INFORMATION PROCESSING DEVICE AND INFORMATION PROCESSING PROGRAM

(71) Applicant: TOSHIBA TEC KABUSHIKI KAISHA, Tokyo (JP)

(72) Inventors: Kenichi Komiya, Kawasaki Kanagawa (JP); Kazuhiko Ohtsu, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 361 days.

(21) Appl. No.: 17/971,216

(22) Filed: Oct. 21, 2022

(65) Prior Publication Data

US 2023/0209288 A1 Jun. 29, 2023

(30) Foreign Application Priority Data

Dec. 23, 2021 (JP) .................................. 2021-208970
Jun. 8, 2022 (JP) .................................. 2022-093114

(51) Int. Cl.
H04R 29/00 (2006.01)
(52) U.S. Cl.
CPC .................................. H04R 29/001 (2013.01)
(58) Field of Classification Search
CPC .... H04R 29/001; H04R 29/007; H04R 27/00; H04R 29/00; H04N 7/147
See application file for complete search history.

(56) References Cited

U.S. PATENT DOCUMENTS 9,706,321 B2 * 7/2017 Salter .................... H04R 29/00
2014/0071225 A1 3/2014 Uchiyama

FOREIGN PATENT DOCUMENTS

JP 2009171197 * 7/2009 ............. G10K 15/04
JP 2009171197 A 7/2009

* cited by examiner

*Primary Examiner* — Yosef K Laekemariam
(74) *Attorney, Agent, or Firm* — Kim & Stewart LLP (57) ABSTRACT

An information processing device for a web conference system includes a speaker to output sound, a microphone to receive sound, and a processor. The processor controls the speaker to output a predetermined tone and acquires first sound data from the microphone while the speaker outputting the predetermined tone. The processor sends the first sound data to another information processing device via a network or the like. Second sound data is then received from the other information processing device. The second sound data corresponds to the first sound data as output by the other information processing device. The processor then compares the first sound data and the received second sound data, outputs a notification indicating a result of the comparison between the first and second sound data.

20 Claims, 7 Drawing Sheets

RECTANGULAR WAVE

FIG. 6B

SAW TOOTH WAVE

FIG. 6C

TRIANGULAR WAVE

FIG. 6D

SINE WAVE

FIG. 7

INFORMATION PROCESSING DEVICE AND INFORMATION PROCESSING PROGRAM

CROSS-REFERENCE TO RELATED APPLICATION

This application is based upon and claims the benefit of priority from Japanese Patent Application No. 2021-208970, filed Dec. 23, 2021, and Japanese Patent Application No. 2022-093114, filed Jun. 8, 2022, the entire contents of which are incorporated herein by reference.

FIELD

Embodiments described herein relate generally to information processing devices and information processing programs for electronic conferencing systems and the like.

BACKGROUND

An electronic conference system may be referred to as a video conference system or a Web conference system. Such a system may have a plurality of information processing devices connected via a network. In such existing electronic conference systems, several externally connected input devices other than a microphone and/or video camera intended to be used may sometimes be associated with the networked information processing devices.

In such a case, if a user errs in the selection of an input device or a selected input device is out of order, multimedia data such as sound data or image data is sometimes not correctly provided.

In an electronic conference system in which a data check between each information processing device and a server is performed to check whether multimedia data can be correctly transmitted, a user of an information processing device might not be able to check how the multimedia data is actually being output to an information processing device of another party.

DETAILED DESCRIPTION

An object of an embodiment is to provide a smoother electronic conference experience.

In one embodiment, an information processing device for a web conference system or the like includes a speaker to output sound, a microphone to receive sound, and a processor. The processor is configured to control the speaker to output a predetermined tone, acquire first sound data from the microphone while the speaker is being controlled to output the predetermined tone, and send the first sound data to another information processing device. The processor then acquires second sound data received from the other information processing device. The second sound data corresponds to the first sound data as output by the other information processing device. The processor then compares the first sound data and the received second sound data and causes a notification to be output indicating a result of the comparison between the first and second sound data.

First Embodiment

[Configuration Examples]

Figure 1:
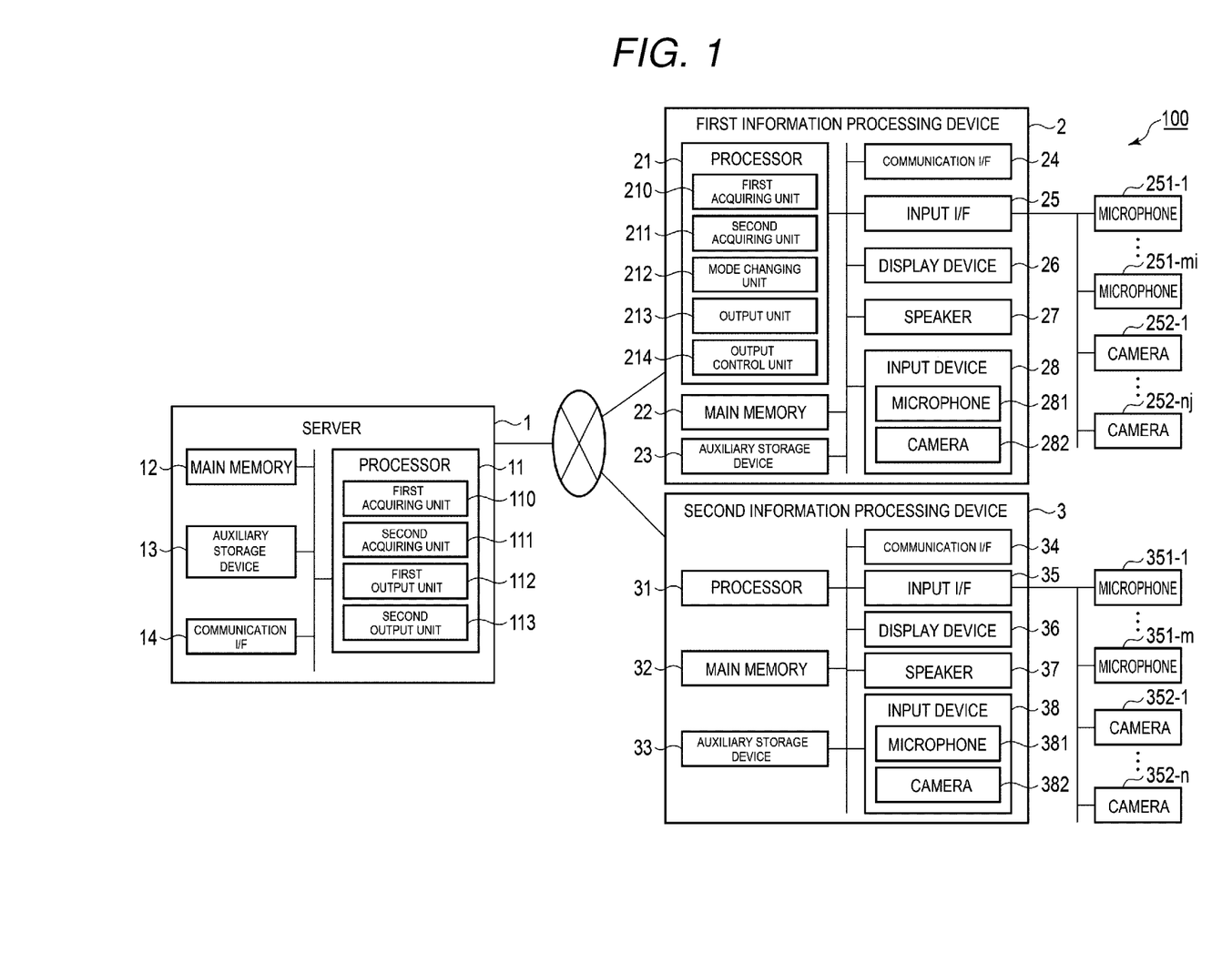
FIG. 1 is a block diagram illustrating a Web conference system according to a first embodiment.

A first embodiment is explained below with reference to the drawings. FIG. 1 is a block diagram illustrating a Web conference system 100 according to the first embodiment.

The Web conference system 100 includes a server 1, a first information processing device 2, and a second information processing device 3. The server 1, the first information processing device 2, and the second information processing device 3 are communicably connected to one another via a network. For example, the network is configured as one or more networks such as the Internet, a mobile communication network, and a LAN (Local Area Network). The networks may be a wireless network or a wired network. The Web conference system 100 in this example is a system including at least two different kinds of equipment networked to one another.

The server 1 is electronic equipment that collects data and processes the collected data. The electronic equipment in this context may be a computer. The server 1 is communicably connected to the first information processing device 2 and the second information processing device 3 via the network. The first information processing device 2 and the second information processing device 3 can be used by different users in different places. The server 1 receives data from the first information processing device 2 and the second information processing device 3 and outputs data to the first information processing device 2 and the second information processing device 3.

The first information processing device 2 is electronic equipment capable of communicating with other electronic equipment. The first information processing device 2 is, for example, used by a participant in a Web conference. For example, the first information processing device 2 is a PC (Personal Computer), a smartphone, a tablet terminal, or the like. "Participant" may also be referred to as a "user" or "person". The first information processing device 2 is an example of an information processing terminal.

The second information processing device 3 is electronic equipment capable of communicating with other electronic equipment. The second information processing device 3 is, for example, equipment used by a host or another participant in the Web conference. For example, the second information processing device 3 is a PC, a smartphone, a tablet terminal, or the like. "Host" may also be referred to as a "user" or "person". The second information processing device 3 is an example of an information processing terminal.

In the following explanation, reference to an "information processing device" without reference numeral indicates the corresponding description can be applicable to the first information processing device 2 and/or the second information processing device 3.

A configuration example of the server 1 is explained.

The server 1 includes a processor 11, a main memory 12, an auxiliary storage device 13, and a communication interface 14 (communication I/F).

The processor 11 can be a CPU (Central Processing Unit) but is not limited to this. The processor 11 may be configured as various circuits. In the present example, processor 11 loads, in the main memory 12, a program stored in advance in the main memory 12 or the auxiliary storage device 13. The program when executed causes the processor 11 to realize or execute units explained below. The processor 11 executes the program loaded in the main memory 12 to execute various operations.

The main memory 12 includes a nonvolatile memory region and a volatile memory region. The main memory 12 stores an operating system and/or programs in the nonvolatile memory region. The main memory 12 uses the volatile memory region as a work area in which data is rewritten as appropriate by the processor 11. For example, the main memory 12 includes a ROM (Read Only Memory) as the nonvolatile memory region. For example, the main memory 12 includes a RAM (Random Access Memory) as the volatile memory region. The main memory 12 stores programs.

The auxiliary storage device 13 can be an EEPROM® (Electric Erasable Programmable Read-Only Memory), an HDD (Hard Disc Drive), an SSD (Solid-State Drive), or the like. The auxiliary storage device 13 may store the programs described above, data used by the processor 11 in performing various kinds of processing, and data generated by the processor 11.

The auxiliary storage device 13 stores information concerning users of the first information processing device 2 and the second information processing device 3 participating in a Web conference provided on the Web conference system 100. The information concerning the users includes, for example, user identification information (e.g., a user ID), identification information of the information processing devices used by the users (e.g., a device ID), or the like. The user identification information is allocated to each of the individual users. The identification information of the information processing devices is allocated to each of the individual information processing devices. The identification information of the information processing devices may be, for example, IP addresses or the like of the information processing devices.

The communication interface 14 is an interface (or interfaces) that can communicably connect the server 1 to other electronic equipment via the network according to a predetermined communication protocol.

A hardware configuration of the server 1 is not limited to the configuration explained above.

Units realized by the processor 11.

The processor 11 provides a first acquiring unit 110, a second acquiring unit 111, a first output unit 112, and a second output unit 113. These units provided by the processor 11 can be also referred to as functions of the processor 11 or a control unit (controller) including the processor 11 and the main memory 12.

The first acquiring unit 110 acquires, from the first information processing device 2, via the communication interface 14, first multimedia data acquired based on an input via an input device of the first information processing device 2. The first multimedia data includes at least one of sound data and image data acquired via the input device of the first information processing device 2. The image data may be still image data (e.g., still pictures) or moving image data (e.g., video). The input device can be any device capable of acquiring or providing sound and/or images such as a built-in microphone, an external microphone, a built-in camera, and an external camera.

The second acquiring unit 111 acquires, from the second information processing device 3, via the communication interface 14, second multimedia data corresponding to the first multimedia data sent to second information processing device 3. The second information processing device 3 processes and outputs the first multimedia data as acquired from the server 1. The second multimedia data is data corresponding to the first multimedia data output from the second information processing device 3. The second acquiring unit 111 may acquire the second multimedia data from the second information processing device 3. The second multimedia data may correspond to first multimedia data that has been stored in the second information processing device 3. Multimedia data transmitted by the first information processing device 2 to the second information processing device 3 via the network is referred to as first multimedia data. Multimedia data returned from the second information processing device 3 to the first information processing device 2 is referred to as second multimedia data. In some examples, the first and second multimedia data may be identical to one another in content.

The first output unit 112 outputs the first multimedia data (acquired by the first acquiring unit 110) to the second information processing device 3 via the communication interface 14. In the following explanation, the term "output" may be considered to mean "transmit".

The second output unit 113 outputs the second multimedia data (acquired by the second acquiring unit 111) to the first information processing device 2 via the communication interface 14.

The first information processing device 2 is electronic equipment including a processor 21, a main memory 22, an auxiliary storage device 23, a communication interface 24, an input interface 25, a display device 26, a speaker 27, and an input device 28 connected to one another.

The processor 21 can be the same type of hardware component(s) as the processor 11. The processor 21 executes a program stored in the main memory 22 or the auxiliary storage device 23 to execute various operations.

The main memory 22 can be the same type of hardware component(s) as the main memory 12. The main memory 22 stores programs to be executed by the processor 21.

The auxiliary storage device 23 can be the same type of hardware component(s) as the auxiliary storage device 13. The auxiliary storage device 23 can store programs to be executed by the processor 21.

The auxiliary storage device 23 in this example stores information concerning the user of the information processing device 2, such as user identification information, identification information of the first information processing device 2, and the like.

The communication interface 24 can be various interfaces that communicably connect the first information processing device 2 to other equipment via the network according to a communication protocol.

The input interface 25 is an interface for connecting the first information processing device 2 to external equipment. In this context, external equipment includes external microphones 251-1 to 251-$mi$ (where mi is an integer equal to or larger than 1) to which sound can be input and external cameras 252-1 to 252-$nj$ (where nj is an integer equal to larger than 1) capable of acquiring imaging data in an imaging range. The input interface 25 is, for example, a USB (Universal Serial Bus). The external microphones 251-1 to 251-*mi* and the external cameras 252-1 to 252-*nj* are examples of input devices.

The display device 26 is capable of displaying various screens under the control of the processor 21. For example, the display device 26 is a liquid crystal display or an EL (Electroluminescence) display.

The speaker 27 is a device capable of outputting sound under control of the first information processing device 2. The speaker 27 is an example of the sound output device.

The input device 28 is a device capable of providing data or an instruction to the first information processing device 2. For example, the input device 28 includes a built-in microphone 281 to which sound can be input and a built-in camera 282 capable of acquiring imaging data in an imaging range. The input device 28 may be or include a keyboard, a touch panel or the like. The microphone 281 is an example of a sound input device.

Units realized by the processor 21.

The processor 21 provides a first acquiring unit 210, a second acquiring unit 211, a mode changing unit 212, an output unit 213, and an output control unit 214. These units provided by the processor 21 can also be referred to as functions of the processor 21 or a control unit or controller including the processor 21 and the main memory 22.

The first acquiring unit 210 acquires the first multimedia data via a selected input device (an input device selected by the user) of the first information processing device 2. The selected input device includes at least one of a selected microphone or a selected camera. The selected microphone is selected out of the built-in microphone 281 and the external microphones 251-1 to 251-*mi*. The selected camera is selected out of the built-in camera 282 and the external cameras 252-1 to 252-*nj*. The first multimedia data is at least one of sound data acquired by the selected microphone or image data acquired by the selected camera.

The second acquiring unit 211 acquires, from the server 1, second multimedia data that corresponds to the first multimedia data. The second multimedia data is at least one of sound data or image data.

The mode changing unit 212 changes an operation mode to a check mode based on an operation of the user of the first information processing device 2. The check mode is an operation mode for performing an operation check on an input device selected by the user. The operation check includes checking whether the selected input device normally operates. For example, the operation check includes checks of an input level, volume, sound quality, and the like of a microphone or image quality, an angle of view, an imaging range, and the like of a camera. The operation of the user includes selecting an input device or changing a previously selected an input device. The mode changing unit 212 may change from the operation mode to the check mode in response to an instruction by the user. The mode changing unit 212 ends the check mode in response to the user of the first information processing device 2 selecting to use the selected input device. In the following explanation, "in response to" may read "based on".

The output unit 213 outputs, via the server 1, the first multimedia data (acquired by the first acquiring unit 210) to the second information processing device 3.

The output control unit 214 causes an output device to output the second multimedia data as acquired by the second acquiring unit 211. The output device can be one of the display device 26 or the speaker 27. The output control unit 214 causes the display device 26 to output, based on the second multimedia data, a selection notification for the user to instruct whether to use the selected input device. The selection notification includes a text message such as "use the selected microphone?", "change the selected microphone?", "use the selected camera?", or "change the selected camera?".

The output control unit 214 may cause the output device to output the first multimedia data and/or the second multimedia data acquired by the first acquiring unit 210. In this case, the output control unit 214 may cause the output device to simultaneously output the first multimedia data and the second multimedia data or may cause the output device to output the first multimedia data or the second multimedia data with a delay of a predetermined time. The predetermined time is, for example, five seconds or ten seconds. The output control unit 214 may cause the display device 26 to output, based on the first multimedia data and the second multimedia data, a selection notification for the user to instruct whether to use the selected input device.

The second information processing device 3 is electronic equipment including a processor 31, a main memory 32, an auxiliary storage device 33, a communication interface 34, an input interface 35, a display device 36, a speaker 37, and an input device 38. The units configuring the second information processing device 3 are connected to one another to be capable of inputting and outputting signals.

The processor 31 can be the same type of hardware component(s) as the processor 11. The processor 31 executes a program stored in the main memory 32 or the auxiliary storage device 33 to execute various operations. Similar to the processor 21, the processor 31 provides a first acquiring unit 210, a second acquiring unit 211, a mode changing unit 212, an output unit 213, and an output control unit 214, or the functions thereof.

The main memory 32 can be the same type of hardware component(s) as the main memory 12. The main memory 32 stores programs to be executed by the processor 31.

The auxiliary storage device 33 can be the same type of hardware component(s) as the auxiliary storage device 13. The auxiliary storage device 33 stores the programs to be executed by the processor 31.

The auxiliary storage device 33 stores information concerning the user of the second information processing device 3. The information concerning the user includes user identification information, identification information of the second information processing device 3, and the like.

The communication interface 34 can be various interfaces that communicably connect the second information processing device 3 to other equipment via the network according to a communication protocol.

The input interface 35 is an interface for connecting the second information processing device 3 to external equipment. In this context, external equipment includes external microphones 351-1 to 351-*m* (where m is an integer equal to or larger than 1) to which sound can be input and external cameras 352-1 to 352-*n* (where n is an integer equal to larger than 1) capable of acquiring imaging data in an imaging range. The input interface 35 is, for example, a USB. The external microphones 351-1 to 351-*m* and the external cameras 352-1 to 352-*n* are examples of an input device.

The display device 36 is capable of displaying various screens under control of the processor 31. For example, the display device 36 is a liquid crystal display or an EL display.

The speaker 37 is a device capable of outputting sound under control of the second information processing device 3.

The input device 38 is a device capable of receiving data or an instruction to the second information processing device 3. For example, the input device 38 can be a built-in microphone 381 to which sound can be input or a built-in camera 382 capable of acquiring imaging data in an imaging range. The input device 38 may be or include a keyboard, a touch panel or the like.

[Operation Example]

A procedure of processing by the Web conference system 100 is explained.

In the following explanation in which processing, functions, or operations of the server 1 are being described, "server 1" may be read as "processor 11". Similarly, in explanation in which processing, functions, or operations of the first information processing device 2 is being described, "first information processing device 2" may be read as "processor 21". Likewise for the second information processing device 3, "second information processing device 3" may be read as "processor 31".

In the example explained below, the users of the first information processing device 2 and the second information processing device 3 are to participate in a Web conference. The users of the first information processing device 2 and the second information processing device 3 log in to the Web conference and select input devices to be used. The user of the first information processing device 2 selects an input device and performs an operation check for the selected input device. In this case, the second information processing device 3 receives multimedia data input by the user of the first information processing device 2 and in turn outputs the received multimedia data.

The processing procedure explained below is only one example, various processing may be changed or altered in other examples.

Figure 2:
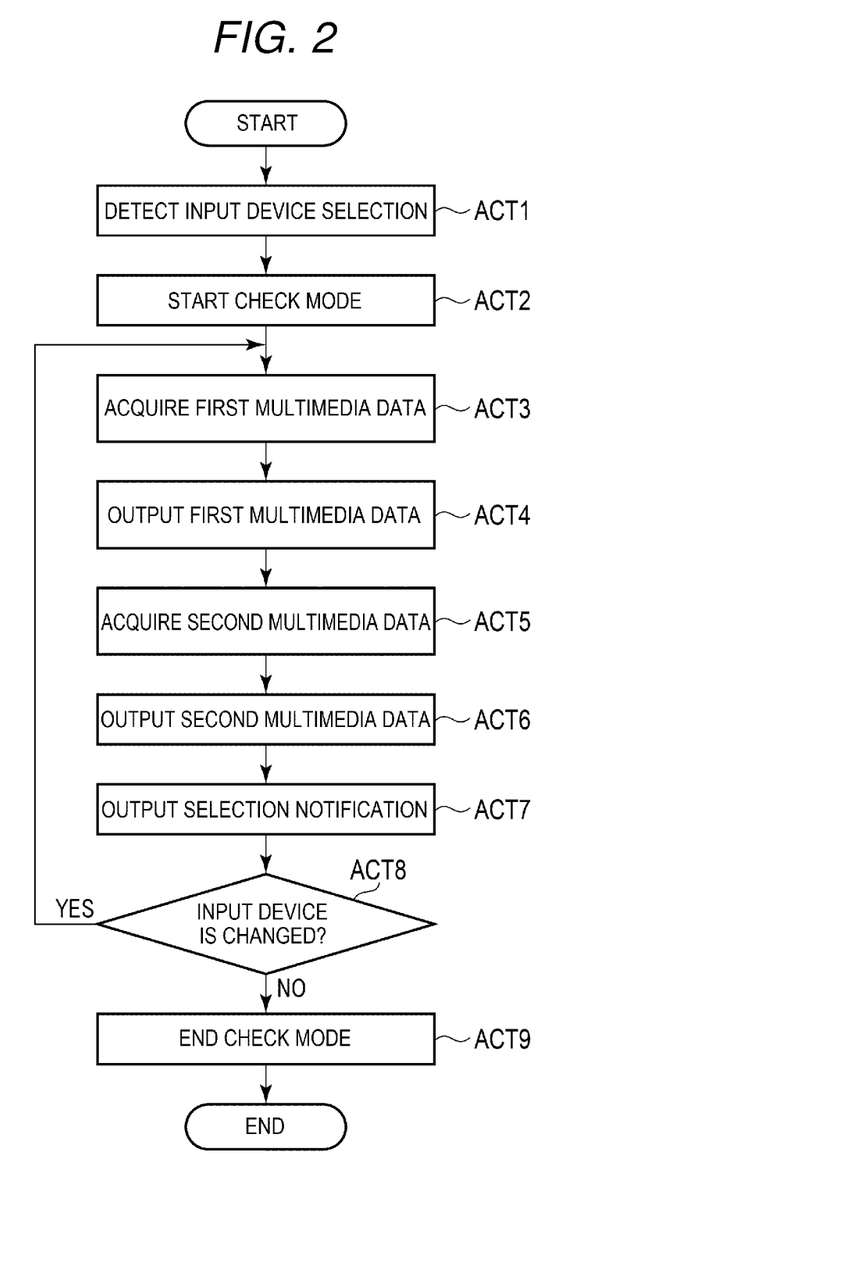
FIG. 2 is a flowchart of information processing by a first information processing device according to a first embodiment.

FIG. 2 is a flowchart illustrating information processing by the first information processing device 2 according to the first embodiment.

The processor 21 detects selection of an input device based on an operation of the user of the first information processing device 2 (ACT 1). In ACT 1, the processor 21 detects the input device selected by the user.

The mode changing unit 212 changes the operation mode to the check mode based on the operation of the user of the first information processing device 2 (ACT 2). In ACT 2, the mode changing unit 212 starts the check mode in response to the selected input device being detected by the processor 21. The mode changing unit 212 outputs a check mode start instruction for starting the check mode to the server 1. The changing the operation mode to the check mode includes starting the check mode. The mode changing unit 212 may change the operation mode to the check mode in response to a direct instruction for changing the operation mode to the check mode input by the user. In this case, the server 1 outputs the check mode start instruction to the second information processing device 3 in response to receiving the check mode start instruction.

The first acquiring unit 210 acquires first multimedia data from the input device selected by the user of the first information processing device 2 (ACT 3). In ACT 3, the first acquiring unit 210 acquires the first multimedia data.

The output unit 213 outputs, via the server 1, the first multimedia data that has been acquired by the first acquiring unit 210 to the second information processing device 3 (ACT 4). In ACT 4, the output unit 213 outputs the first multimedia data to the server 1.

The server 1 outputs the first multimedia data received from output unit 213 to the second information processing device 3. The second information processing device 3 thus acquires the first multimedia data. The second information processing device 3 outputs second multimedia data corresponding to the first multimedia data via a selected output device. The second information processing device 3 also transmits the second multimedia data to the server 1.

In the check mode, the second acquiring unit 211 acquires the second multimedia data from the second information processing device 3 via the server 1 (ACT 5). In ACT 5, the second acquiring unit 211 acquires the second multimedia data from the server 1. The second acquiring unit 211 may save the second multimedia data in the auxiliary storage device 23.

The output control unit 214 causes the output device to output the second multimedia data that has been acquired by the second acquiring unit 211 (ACT 6). In an example, the output control unit 214 causes the output device to output just the second multimedia data acquired by the second acquiring unit 211. In another example, the output control unit 214 causes the output device to output both the first multimedia data and the second multimedia data. The output control unit 214 causes the output device to output the first multimedia data (acquired by the first acquiring unit 210 and/or the second multimedia data (acquired by the second acquiring unit 211). The output control unit 214 may cause the output device to simultaneously output the first multimedia data and the second multimedia data. If the first multimedia data includes sound data, the output control unit 214 may cause the output device to output the second multimedia data at a delay of a predetermined length of time.

The output control unit 214 causes the output device to output, based on the second multimedia data, a selection notification prompting the user to instruct whether to use the input device previously selected by the user (ACT 7). In an example, the output control unit 214 causes the display device 26 to output the selection notification based on the second multimedia data acquired by the second acquiring unit 211. In another example, the output control unit 214 causes the display device 26 to output the selection notification based on both the first multimedia data and the second multimedia data. In some examples, the output control unit 214 may cause the speaker 27 to output the selection notification as sound or voice data.

The processor 21 determines, based on the input operation (selection) of the user, whether the selected input device has been changed (ACT 8). In ACT 8, the processor 21 acquires the selection instruction made by the user.

If the selected input device is changed (YES in ACT 8), the processing returns from ACT 8 to ACT 3. In ACT 3, the first acquiring unit 210 acquires the first multimedia data received from the newly selected input device.

If the selected input device is not changed (NO in ACT 8), the processing proceeds from ACT 8 to ACT 9.

The mode changing unit 212 then ends the check mode (ACT 9). In ACT 9, for example, the mode changing unit 212 changes the operation mode from the check mode to a normal mode. The normal mode is an operation mode for executing a Web conference. The mode changing unit 212 also outputs a check mode end instruction to the second information processing device 3 via the server 1.

In some examples, ACT 7 may be omitted. That is, the output control unit 214 may not cause the output device to output the selection notification. In this case, the processor 21 in ACT 8 could just detect if a new/different input device is selected by the user to determine whether the previously selected input device has been changed. The other processing might be substantially unchanged.

Figure 3:
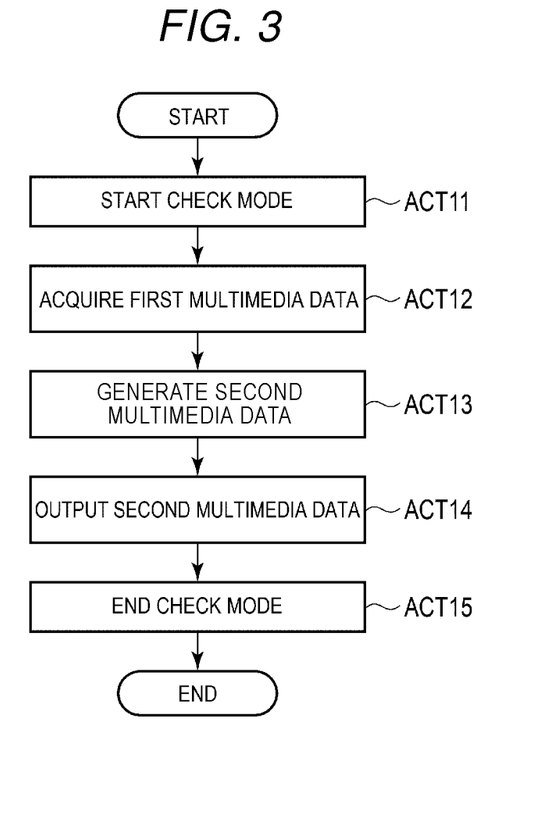
FIG. 3 is a flowchart of information processing by a second information processing device according to a first embodiment.

FIG. 3 is a flowchart illustrating information processing by the second information processing device 3 according to the first embodiment.

The processing explained below is executed based on the operation mode of the first information processing device 2 being changed to the check mode.

The processor 31 starts a check mode (ACT 11). In ACT 11, the processor 31 acquires a check mode start instruction from the first information processing device 2 via the server 1. That is, processor 31 acquires the check mode start instruction from the server 1 rather than directly from the first information processing device 2.

The processor 31 acquires, via the server 1, the first multimedia data output from the first information processing device 2 (ACT 12). The processor 31 may save the first multimedia data in the auxiliary storage device 33 at this point.

The processor 31 generates the second multimedia data from the acquired first multimedia data and outputs the generated second multimedia data to an output device (ACT 13). The output device can be one or both of the display device 36 or the speaker 37. In ACT 13, the second multimedia data is obtained by processing the first multimedia data for supply to the output device.

The processor 31 next outputs the second multimedia data to the first information processing device 2 via the server 1 (ACT 14). The server 1 then outputs the second multimedia data to the first information processing device 2.

The processor 31 ends the check mode in response to a check mode end instruction from the first information processing device 2 (ACT 15). In ACT 15, for example, the processor 31 acquires the check mode end instruction via the server 1.

Figure 4:
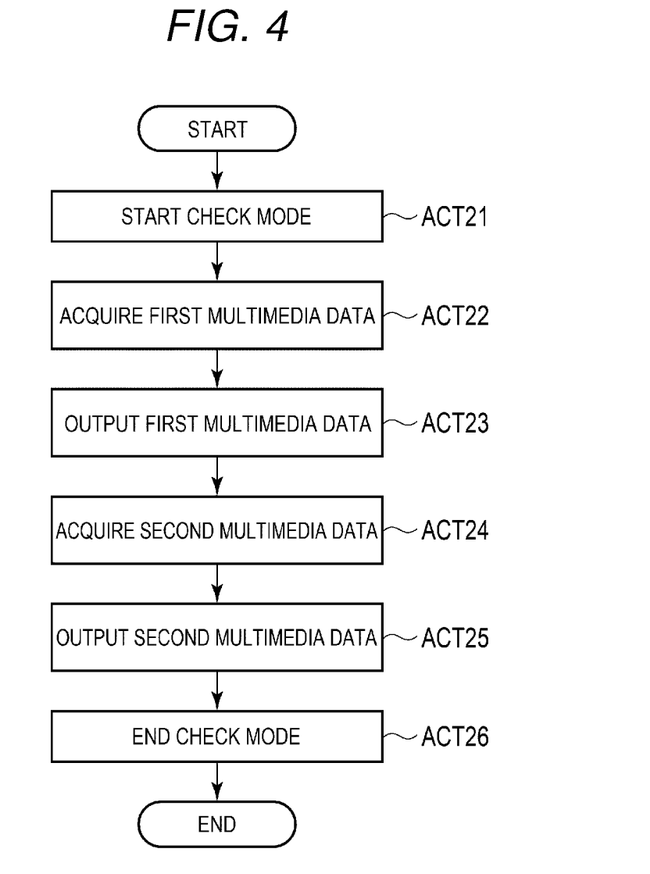
FIG. 4 is a flowchart of information processing by a server according to a first embodiment.

FIG. 4 is a flowchart illustrating information processing by the server 1 according to the first embodiment.

The processing explained below is executed based on the operation mode of the first information processing device 2 being changed to the check mode.

The processor 11 starts the check mode (ACT 21). In ACT 21, for example, the processor 11 acquires a check mode start instruction from the first information processing device 2. The processor 11 in turn outputs the check mode start instruction to the second information processing device 3.

The first acquiring unit 110 acquires first multimedia data from a selected input device in the first information processing device 2 (ACT 22).

The first output unit 112 outputs the first multimedia data (acquired by the first acquiring unit 110) to the second information processing device 3 (ACT 23).

The second acquiring unit 111 acquires second multimedia data corresponding to the first multimedia data from the second information processing device 3 (ACT 24).

The second output unit 113 outputs the second multimedia data (acquired by the second acquiring unit 111) to the first information processing device 2 (ACT 25).

The processor 11 ends the check mode (ACT 26). In ACT 26, for example, the processor 11 acquires a check mode end instruction from the first information processing device 2. The processor 11 changes from the check mode to the normal mode in response to the check mode end instruction.

[Effects]

The first information processing device 2 used in the Web conference system 100 according to the first embodiment can acquire the first multimedia data via an input device, output the first multimedia data to another information processing device, acquire the second multimedia data corresponding to the first multimedia data from the other information processing device, and cause an output device to output the second multimedia data.

For example, the first information processing device 2 can output to an output device of the first information processing device 2, multimedia data output from another information processing device in response to receiving of the multimedia data from the first information processing device 2. Consequently, the user of the first information processing device 2 can check how the first multimedia data is being output by the other information processing device. For example, the first multimedia data could be deteriorated by the influence of the network connection in the transmission of data from the first information processing device 2 to the second information processing device 3. In this way, the first information processing device 2 can realize a smoother electronic conference by permitting the user of the first information processing device to confirm transmitted data is being output appropriately at the destination.

The first information processing device 2 according to the first embodiment can cause the output device to output, based on the second multimedia data, a selection notification prompting the user to select which input device to use. Further, the first information processing device 2 can cause the output device to output the first multimedia data and the second multimedia data and cause the output device to output, based on the first multimedia data and the second multimedia data, a selection notification prompting the user to instruct which the input device is to be used. Consequently, the user of the first information processing device 2 can select which input device to use based on the returned second multimedia data. The user of the first information processing device 2 can select an input device based on the comparison between the first multimedia data (transmitted data) and the second multimedia data (returned data). Accordingly, the first information processing device 2 can prompt the user to select an appropriate input device based on the second multimedia data from the transmission destination (other user's device) and realize a smoother electronic conference.

The first information processing device 2 according to the first embodiment can change the operation mode to the check mode based on operation of the user and acquire the second multimedia data in the check mode. In some examples, the first information processing device 2 can end the check mode in response a user selection of an input device being selected by the user. In some examples, the first information processing device 2 acquires the second multimedia data only when the operation mode is changed to the check mode (from a normal mode or the like). Accordingly, the first information processing device 2 can realize a smoother electronic conference while reducing a processing load since the additional check processing occurs only outside the normal mode.

[Modifications]

The first information processing device 2 and the second information processing device 3 described above include a plurality of microphones and a plurality of cameras but are not limited to this. The first information processing device 2 and the second information processing device 3 may include just one microphone or just one camera.

The information processing device according to the first embodiment explained above can be configured as follows:

[1] An information processing device for use in a Web conference system, the information processing device including:

a first acquiring unit configured to acquire first multimedia data based on an input via an input device;

an output unit configured to output the first multimedia data acquired by the first acquiring unit to another information processing device different from the information processing device;

a second acquiring unit configured to acquire, from the other information processing device, second multimedia data corresponding to the first multimedia data; and an output control unit configured to cause the output unit to output the second multimedia data acquired by the second acquiring unit.

[2] The information processing device described in [1], wherein the output control unit causes the output unit to output a selection notification for a user to instruct whether to use the input device after the second multimedia data is received/acquired.

[3] The information processing device described in [1], wherein the output control unit causes the output unit to output both the first multimedia data and the second multimedia data, and the output control unit causes the output unit to output a selection notification for a user to instruct whether to use the input device.

[4] The information processing device described in [2] or [3], further including a mode changing unit configured to change an operation mode to a check mode, wherein the second acquiring unit acquires the second multimedia data only in the check mode.

[5] The information processing device described in [4], wherein the mode changing unit ends the check mode after the input device is selected by the user.

[6] An information processing program for causing a computer to execute:

a first acquiring function for acquiring first multimedia data based on an input via an input device of an information processing device used in a Web conference system;

an output function for outputting the first multimedia data acquired by the first acquiring function to another information processing device different from the information processing device;

a second acquiring function for acquiring, from the other information processing device, second multimedia data corresponding to the first multimedia data; and an output control function for causing the output function to output the second multimedia data acquired by the second acquiring function.

Second Embodiment

In description of the second embodiment, differences from the first embodiment are primarily explained. In the accompanying drawings, aspects that are substantially the same as those of the first embodiment have the same reference symbols. Explanation of such repeated components may be omitted.

[Configuration Examples]

Figure 5:
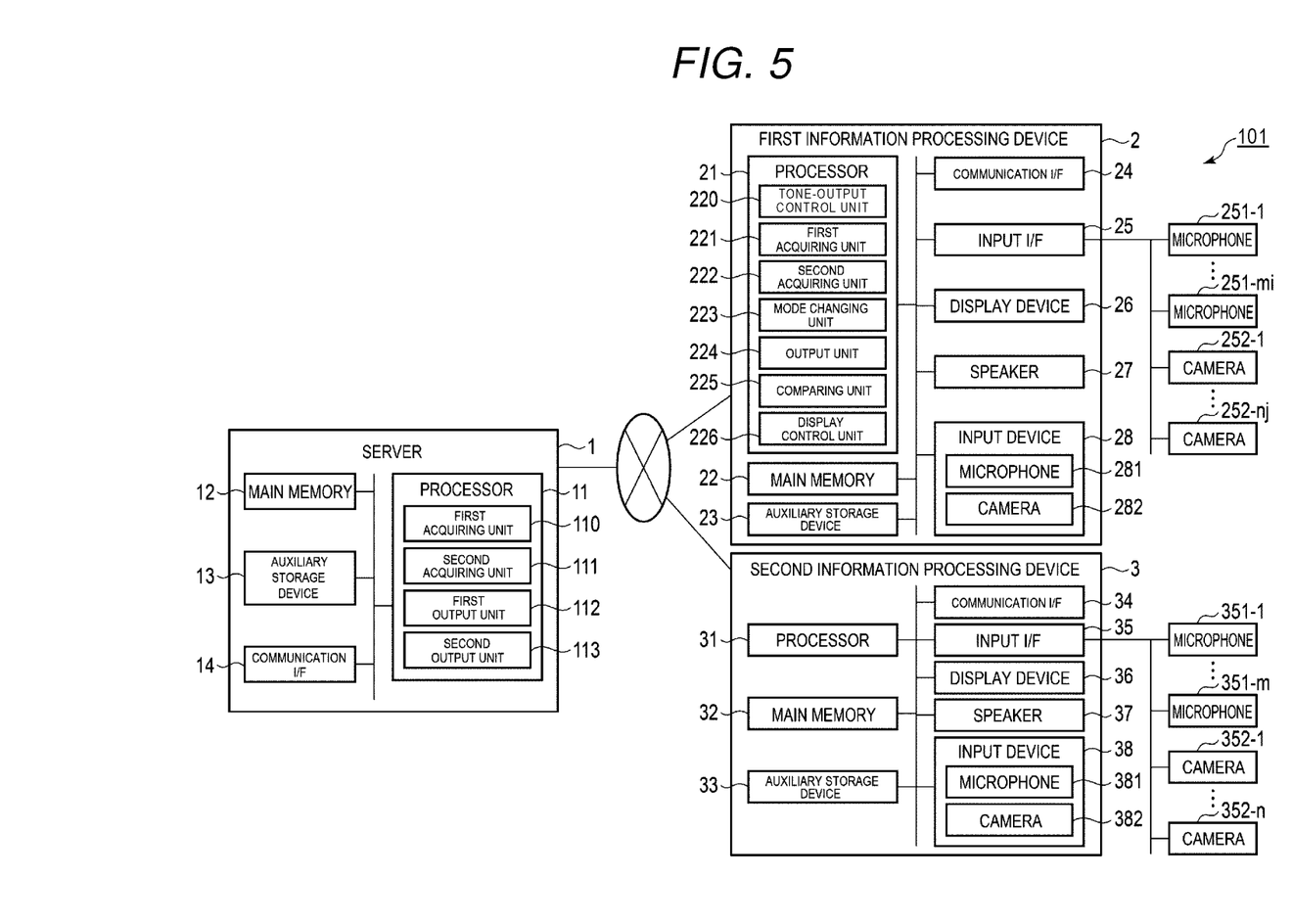
FIG. 5 is a block diagram illustrating a Web conference system according to a second embodiment.
Figure 6A:
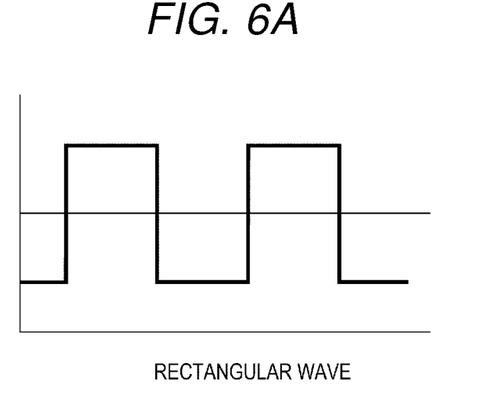
FIGS. 6A to 6D are diagrams illustrating waveforms of sound (tone) data according to a second embodiment.
Figure 6B:
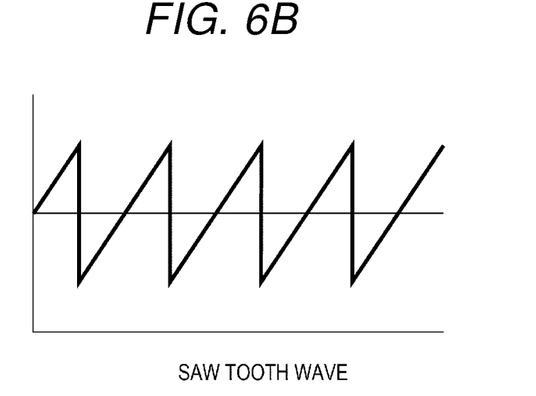
Figure 6C:
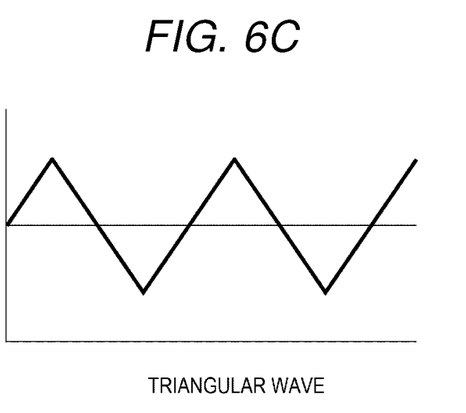
Figure 6D:
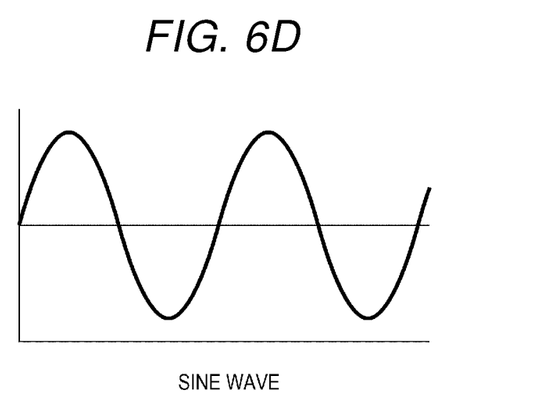

FIG. 5 is a block diagram illustrating a Web conference system according to the second embodiment.

The Web conference system 101 includes a server 1, a first information processing device 2, and a second information processing device 3. The server 1, the first information processing device 2, and the second information processing device 3 are communicably connected to one another via a network. Additional information processing devices may be connected to the network and incorporated in the Web conference system 101 in some examples The configuration of the server 1 can be the same as in the first embodiment.

The first information processing device 2 in this second embodiment includes a processor 21, a main memory 22, an auxiliary storage device 23, a communication interface 24, an input interface 25, a display device 26, a speaker 27, and an input device 28 as in the first embodiment.

In general, the processor 21, the main memory 22, the auxiliary storage device 23, the communication interface 24, the input interface 25, the display device 26, the speaker 27, and the input device 28 can have the same configuration in the first embodiment.

The auxiliary storage device 23 in the second embodiment can be used to save sound data (e.g., data corresponding to a tone signal) having a specific frequency. In this context, the specific frequency can be a frequency inaudible (or substantially so) to an expected or standard user (e.g., outside the audible range of human hearing). However, in some examples, the specific frequency may be within a range in which younger user might typically be able to distinguish though older users mostly can not. The sound data having a specific frequency can be, for example, a waveform such as a rectangular wave, a saw tooth wave, a triangular wave, or a sinewave such as illustrated in FIGS. 6A to 6D, respectively. In an example, the specific frequency of the sound data is outside the human audible region. The human audible region is considered to be about 20 Hz to 20 kHz. In some examples, the specific frequency may be within the human audible region but near the upper limit or the lower limit. The specific frequency may be at or lower than a processable sampling rate of the first information processing device 2. For example, the sampling rate may be 48 kHz. In a particular example, the sound data with the specific frequency is a sine wave or a rectangular wave at a frequency of 20 kHz. In some examples, different frequencies or waveform types may be mixed or otherwise incorporated in the sound data (tone signal).

The processor 21 in the second embodiment provides a tone-output control unit 220, a first acquiring unit 221, a second acquiring unit 222, a mode changing unit 223, an output unit 224, a comparing unit 225, and a display control unit 226. These units (and corresponding functions thereof) provided by the processor 21 can also be referred to as functions of the processor 21. These units/functions can also be considered to be provided by a control unit (or controller) including the processor 21 and the main memory 22.

The tone-output control unit 220 controls an output of predetermined tone or sound via the speaker 27. The tone-output control unit 220 acquires the sound data to be output from the auxiliary storage device 23. The tone-output control unit 220 causes the speaker 27 to output a predetermined tone based on the stored sound data having the specific frequency.

The first acquiring unit 221 acquires first sound data including the predetermined tone via a microphone that has been selected by the user of the first information processing device 2. The microphone can be the built-in microphone 281 or one of the external microphones 251-1 to 251-*mi*. The first sound data is the sound data received by the selected microphone. The sound received by this microphone includes predetermined tone that is output by the speaker 27. The sound received by the microphone can also include the voice of user of the first information processing device 2. The sound data corresponding to the predetermined tone is, for example, obtained by A/D-converting the predetermined tone when output via the speaker 27. The sound data corresponding to the predetermined tone will have a particular frequency, even if other sounds (e.g., user speech/voice sounds) are also present in the microphone input. The first acquiring unit 221 may save the first sound data in the auxiliary storage device 23.

The second acquiring unit 222 acquires, via the server 1, second sound data from the second information processing device 3. The second sound data corresponds to the first sound data as output by the second information processing device 3. The second acquiring unit 222 may save the second sound data in the auxiliary storage device 23.

The mode changing unit 223 changes the operation mode to the check mode based on an operation of the user of the first information processing device 2. The mode changing unit 223 may change the operation mode to the check mode in response to a specific instruction to change the operation mode to the check mode from the user. The mode changing unit 223 ends the check mode in response to an input device being selected for use by the user of the first information processing device 2.

The output unit 224 outputs, via the server 1, the first sound data acquired by the first acquiring unit 221 to the second information processing device 3.

The comparing unit 225 compares the first sound data and the second sound data. The comparing unit 225 acquires, for example, the first sound data from the auxiliary storage device 23. The comparing unit 225 may also acquire the second sound data from the auxiliary storage device 23 rather than from the server 1 or otherwise. The comparing unit 225 determines whether the second sound data sufficiently coincides (matches) with the first sound data. The comparing unit 225 may detect, for example, whether the second sound data includes the specific frequency tone that has been included in the first sound data. When the second sound data includes the data corresponding to specific frequency tone, the comparing unit 225 decides that the second sound data coincides with the first sound data. If the second sound data does not include the specific frequency tone, the comparing unit 225 decides that the second sound data does not coincide with the first sound data.

In another example, the comparing unit 225 may determine a match based on a ratio of the temporal length of the data having the specific frequency (tone length) included in the second sound data to the temporal length of the predetermined tone included in the first sound data (also referred to as a "tone length ratio"). A case may occur that the specific frequency tone temporarily or intermittently drops out of the second sound data because of a transient situation of the second information processing device 3 or the network. In this case, if the tone length ratio is 100%, the comparing unit 225 may determine that the second sound data coincides with the first sound data. However, if the tone length ratio is not 100%, the comparing unit 225 may determine that the second sound data does not coincide with the first sound data.

In still another example, the comparing unit 225 may determine in a stepwise or incremental manner, the degree of coincidence between the second sound data and the first sound data based on the tone length ratio. Thus, for example, if the tone length ratio is 90% or higher, the comparing unit 225 might determine the coincidence degree as "excellent" but if the tone length ratio is between 50% and 90%, the comparing unit 225 may determine the coincidence degree as "good". If the tone length ratio is lower than 50%, the comparing unit 225 may determine the coincidence degree as "bad". Stages of the coincidence degree are not limited to three stages of "excellent", "good", and "bad" and may be any number of stages. The comparing unit 225 may, for example, determine the coincidence degree as a numerical value such as "100%" or "50%".

The display control unit 226 displays a comparison result provided by the comparing unit 225 on the display device 26. The display control device 226 may display, on the display device 26, a notification indicating that the second sound data coincides with the first sound data or a notification indicating that the second sound data does not coincide with the first sound data. A notification indicating that the second sound data coincides or not with the first sound data may be referred to as a coincidence notification. A notification indicating that the second sound data does not coincide with the first sound data may be referred to as a noncoincidence notification. The display control unit 226 may display, on the display device 26, a notification indicating a coincidence degree for the second sound data and the first sound data. A notification indicating the coincidence degree may be referred to as a coincidence degree notification. When the second sound data does not coincide with the first sound data, the display control unit 226 may display, on the display device 26, a notification indicating that the second sound data does not coincide with the first sound data. The display control unit 226 may display such a notification on the display device 26 if the second sound data does not coincide with the first sound data or if the coincidence degree is low. The display control unit 226 may display coincidence notifications and noncoincidence notifications in different display forms, formats, or the like such that different types of notifications may be readily distinguishable. The display control unit 226 may display coincidence degree notifications in a different display forms or formats according to the value of the coincidence degree. Possible display form and format types include text decoration such as a character color, a size, a font type, text emphasis (e.g., outlining, underlining, bold, italics, etc.), display brightness, a display background color, display background brightness, display background pattern, a message frame color, text flashing, and the like. The display control unit 226 may display coincidence notifications, noncoincidence notifications, and coincidence degree notifications as a popup notification. The display of notifications may be adjusted based on setting by the user.

The second information processing device 3 is substantially the same as in the first embodiment.

[Operation Example]

A procedure of processing by the Web conference system 101 is explained.

In the following explanation in which processing, functions, or operations of the server 1 are being described, "server 1" may be read as "processor 11". Similarly, in explanation in which processing, functions, or operations of the first information processing device 2 is being described, "first information processing device 2" may be read as "processor 21". Likewise for the second information processing device 3, "second information processing device 3" may be read as "processor 31".

In the example explained below, the users of the first information processing device 2 and the second information processing device 3 are to participate in a Web conference. After users of the first information processing device 2 and the second information processing device 3 log in to the Web conference, they select input devices (e.g., microphones, cameras, etc.) to be used in the Web conference.

In the present example, the user of the first information processing device 2 selects the microphone 281 as the input device and then performs an operation check on the microphone 281. In this case, the second information processing device 3 receives, via the server 1, sound data input to the microphone 281 of the first information processing device 3. The second information processing device 3 then outputs sound from its speaker device or the like corresponding to the sound data received via the server 1 from the first information processing device 2.

Figure 7:
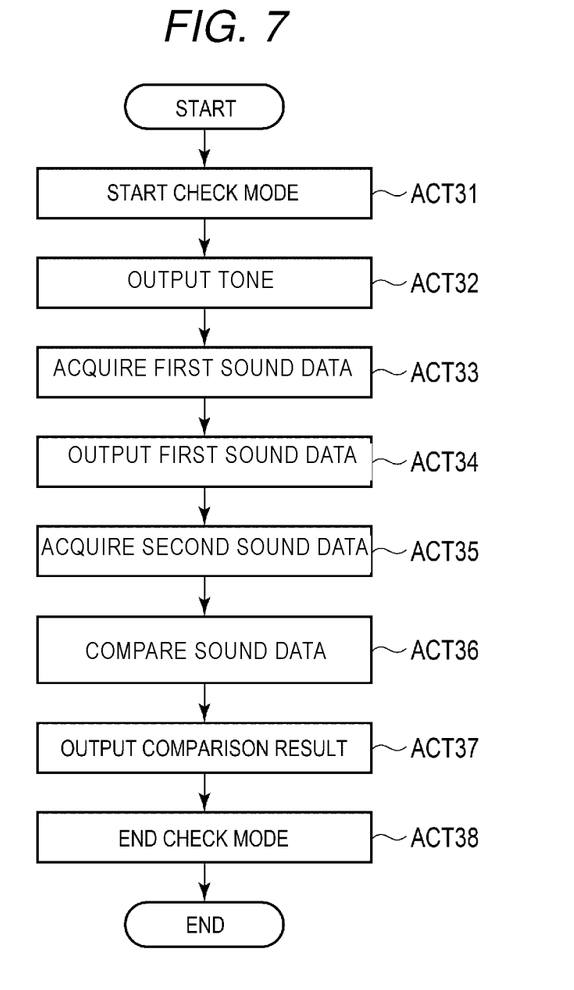
FIG. 7 is a flowchart of information processing by a first information processing device according to a second embodiment.

FIG. 7 is a flowchart illustrating information processing by the first information processing device 2 according to the second embodiment.

The mode changing unit 223 changes the operation mode to the check mode based on an operation of the user of the first information processing device 2 (ACT 31). The operation is, for example, selecting the microphone 281. The operation may be a specific instruction from the user for shifting to the check mode. In ACT 31, for example, the mode changing unit 223 starts the check mode in response to a selection of the microphone 281 being detected by the processor 21. The mode changing unit 223 outputs a check mode start instruction for starting the check mode to the server 1. The server 1 then outputs the check mode start instruction to the second information processing device 3 in response to receiving the check mode start instruction from the first information processing device 2.

The tone-output control unit 220 controls an output of a predetermined tone from the speaker 27 (ACT 32). In ACT 32, for example, the tone-output control unit 220 acquires sound data having a specific frequency from the auxiliary storage device 23. The sound data may have a preset frequency or a frequency set by the user. The tone-output control unit 220 may acquire sound data having a mix of frequencies from the auxiliary storage device 23. The tone-output control unit 220 D/A-converts the acquired sound data and causes the speaker 27 to output the predetermined tone.

The first acquiring unit 221 acquires, via the microphone 281, first sound data including the predetermined tone (ACT 33). In ACT 33, for example, the first acquiring unit 221 A/D-converts sound input to the microphone 281. If the predetermined tone output from the speaker 27 is received by the microphone 281, the first acquiring unit 221 A/D-converts the predetermined tone as input to the microphone 281. The first acquiring unit 221 thus acquires, as the first sound data, sound data including the predetermined tone. If the voice of the user or other sound is input to the microphone 281, the first acquiring unit 221 also A/D-converts these sounds. The first acquiring unit 221 saves the first sound data in the auxiliary storage device 23.

The output unit 224 outputs, via the server 1, the acquired first sound data to the second information processing device 3 (ACT 34).

The server 1 then outputs the first sound data to the second information processing device 3. The second information processing device 3 thus acquires the first sound data. The second information processing device 3 performs control to output sound corresponding to the first sound data from the speaker 37. The second sound data is the data prepared by the second information processing device 3 for output by the speaker 37 based on the receiving of the first sound data from the server 1. The second information processing device 3 outputs the prepared second sound data to the server 1. The server 1 then outputs this second sound data to the first information processing device 2.

The second acquiring unit 222 acquires, via the server 1, the second sound data from the second information processing device 3 (ACT 35). The second acquiring unit 222 may save the second sound data in the auxiliary storage device 23.

The comparing unit 225 then compares the first sound data and the second voice data (ACT 36). In ACT 36, for example, the comparing unit 225 acquires both the first sound data and the second voice data from the auxiliary storage device 23. The comparing unit 225 then determines whether the second sound data coincides with the first sound data. The comparing unit 225 may determine a coincidence degree based on a tone length ratio or other comparative measure for coincidence between the first and second sound data.

The display control unit 226 displays a comparison result from the comparing unit 225 on the display device 26 (ACT 37). In ACT 37, for example, the display control unit 226 displays a notification indicating the comparison result on the display device 26. The notification indicating the comparison result can be, for example, a coincidence notification, a noncoincidence notification, or a coincidence degree notification. The display control unit 226 may change notification display forms and formats according to the comparison result.

The mode changing unit 223 ends the check mode in response to the microphone 281 being selected for use by the user of the first information processing device 2 (ACT 38). The mode changing unit 223 changes the operation mode from the check mode to the normal mode. The mode changing unit 223 outputs a check mode end instruction to the second information processing device 3 via the server 1.

In some examples, the mode changing unit 223 may change the operation mode to the check mode without specific instruction from the user of the first information processing device 2. For example, the mode changing unit 223 may periodically repeat the check mode. Such a check repeat interval may be set by the user or preset. In this case, the processor 21 repeats the processing in ACT 32 to ACT 37 at intervals. The mode changing unit 223 may also change the operation mode from the check mode to the normal mode in response to an instruction (e.g., an override instruction) from the user of the first information processing device 2. The mode changing unit 223 may also end the check mode based on an elapse of time (a timing out period) as set by the user or otherwise. The mode changing unit 223 may also immediately end the check mode once it is determined the first sound data and the second sound data sufficiently coincide over a predetermined period.

Information processing by the second information processing device 3 is the same as in the first embodiment, however, in the second embodiment, "multimedia data" as related to the described processing in ACT 11 to ACT 15 for the first embodiment can be considered to be sound data alone.

Information processing by the server 1 is the same in the first embodiment, however, in the second embodiment "multimedia data" as related to the described processing in ACT 21 to ACT 26 for the first embodiment can be considered to be sound data alone.

[Effects]

The first information processing device 2 used in the Web conference system 101 according to the second embodiment can cause the output of a predetermined tone via a local speaker. The first information processing device 2 can acquire, via a local microphone, first sound data including the predetermined tone. The first information processing device 2 can then output the acquired first sound data to another information processing device. The first information processing device 2 can then acquire second sound data (corresponding to the first sound data as output by the other information processing device) from the other information processing device. The first information processing device 2 can compare the first sound data to the acquired second sound data. The first information processing device 2 can then display a comparison result on a local display device. Accordingly, the first information processing device 2 can check whether sound data output by the first information processing device matches the sound data output at the other information processing device (e.g., second information processing device 3). Consequently, the user of the first information processing device 2 can check whether the first sound data is being correctly output by another information processing device. For example, the first sound data could be deteriorated by the influence of the network in transmission from the first information processing device 2 to the second information processing device 3, and the user of the first information processing device 2 can check whether sound appropriately reaches the other party (device) by comparison of the first and second sound data. Since the first information processing device 2 can cause the output of the predetermined tone via the local speaker 27 (or the like) without actually requiring the user of the first information processing device 2 to speak, it can be checked whether sound can reach the other party at the start of a conference. In this way, the first information processing device 2 can realize a smoother electronic conference experience.

The first information processing device 2 according to the second embodiment can output a tone or the like of a specific frequency. Consequently, since the first information processing device 2 sets the frequency of the tone in the sound data, the first information processing device 2 can more easily compare the first sound data and the second sound data.

The tone or the like output by the local speaker of the first information processing device 2 may have a frequency equal to or lower than the sampling rate of the microphone data of the first information processing device 2. If a sampling rate, which is a period for capturing sound data, is too much lower than a frequency of the sound data being output, the sound data cannot be accurately captured. However, if the sampling rate is higher than the frequency of the sound data, the sound data can be accurately captured. Accordingly, by using sound data (a tone) having a frequency at or lower than a sampling rate, the first information processing device 2 can more accurately capture the sound data.

The first information processing device 2 according to the second embodiment can output sound at a frequency outside a human audible region. Consequently, the first information processing device 2 can compare the first voice data and the second voice data using a sound (tone) that is inaudible to the user of the first information processing device 2 and other participants in the Web conference. Accordingly, sound checks can be performed without hindering an on-going Web conference. In this way, the first information processing device 2 can provide a smoother electronic conference experience for participants.

[Modifications]

The first information processing device 2 and the second information processing device 3 are explained above as including a plurality of microphones and a plurality of cameras but are not limited to this. The first information processing device 2 and the second information processing device 3 may include just one microphone or camera.

Other Embodiments

An information processing device used in an embodiment may be realized by distributed or cloud-based components.

A program for providing described functionality and configuration of a processor or control unit may be transferred to an end user by being stored in an information processing device or may be transferred by subsequent download, installation, or the like to the information processing device. Such a program may be transferred via a network or recorded in a non-transitory, computer-readable recording medium such as a CD-ROM, a memory card, or the like.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing device for a conference system, the device comprising:
   a speaker to output sound;
   a microphone to receive sound; and
   a processor configured to:
   control the speaker to output a predetermined tone;
   acquire first sound data from the microphone while the speaker is being controlled to output the predetermined tone;
   send the first sound data to another information processing device;
   acquire second sound data received from the other information processing device, the second sound data corresponding to the first sound data as output by the other information processing device;
   compare the first sound data and the received second sound data; and
   cause a notification to be output, the notification indicating a result of the comparison between the first and second sound data, wherein
   the comparison between the first and second sound data includes a calculation of a tone length ratio based on the length of the predetermined tone in the second sound data to the length of the predetermined tone in the first sound data.

2. The information processing device according to claim 1, wherein the output of the notification includes causing a display to display the result of the comparison between the first and second sound data.

3. The information processing device according to claim 1, wherein the predetermined tone includes a sound at a frequency that is outside a human audible range.

4. The information processing device according to claim 1, wherein the frequency of the predetermined tone is less than a sampling rate of the processor for sound data received by the microphone.

5. The information processing device according to claim 1, wherein the frequency of the predetermined tone is greater than a sampling rate of the processor for sound data received by the microphone.

6. The information processing device according to claim 1, further comprising:
   a camera to acquire images, wherein
   the processor is further configured to cause image data from the camera to be sent the other information processing device.

7. The information processing device according to claim 1, further comprising:
a communication interface for connecting to a server via a network connection, wherein
the other information processing device is also connected to the server.

8. The information processing device according to claim 1, wherein the processor is configured to cause the predetermined tone to be output only when in a check mode.

9. The information processing device according to claim 8, wherein the processor enters the check mode upon receipt of an instruction from a user made via an input device during a conference.

10. The information processing device according to claim 8, wherein the processor enters the check mode at fixed time intervals during a conference.

11. The information processing device according to claim 8, wherein the processor exits the check mode upon a user selecting the microphone to be used during a conference.

12. A web conference system, comprising:
a server connected to a network;
a plurality of information processing devices connected to the server via network, at least one of the plurality of information processing devices being an information processing device according to claim 1.

13. An information processing method for web conference systems, the method comprising:
controlling of a speaker of an information processing device to output a predetermined tone;
acquiring first sound data from a microphone of the information processing device while the speaker is outputting the predetermined tone;
sending the first sound data to another information processing device via a network;
receiving second sound data from the other information processing device, the second sound data corresponding to the first sound data as output by the other information processing device;
comparing the first sound data and the received second sound data; and
outputting a notification indicating a result of the comparison between the first and second sound data, wherein
the comparing of the first and second sound data includes a calculation of a tone length ratio based on the length of the predetermined tone in the second sound data to the length of the predetermined tone in the first sound data.

14. The information processing method according to claim 13, wherein the predetermined tone is at a frequency outside a normal human audible range.

15. The information processing method according to claim 13, wherein the outputting of the notification includes causing a display to display the result of the comparison between the first and second sound data.

16. The information processing method according to claim 13, wherein the predetermined tone is output only when the information processing device is in a check mode.

17. The information processing method according to claim 16, wherein the information processing device enters the check mode upon receipt of an instruction from a user made via an input device during a conference.

18. The information processing method according to claim 16, wherein the information processing device enters the check mode at fixed time intervals during a conference.

19. The information processing method according to claim 16, wherein the information processing device exits the check mode upon a user selecting the microphone to be used during a conference.

20. The information processing method according to claim 13, wherein the predetermined tone is generated by one of a rectangular wave, a saw tooth wave, or a triangular wave.

* * * * *